United States Patent Office 3,321,533
Patented May 23, 1967

3,321,533
SURFACE ACTIVE AGENTS FROM ORGANO-
METALLIC COMPOUNDS
John T. Patton, Jr., Wyandotte, and Mason H. Earing,
Grosse Ile, Mich., assignors to Wyandotte Chemicals
Corporation, Wyandotte, Mich., a corporation of
Michigan
No Drawing. Filed Aug. 5, 1963, Ser. No. 300,083
18 Claims. (Cl. 260—615)

The present invention relates to surface active agents, and is more particularly concerned with the production of nonionic surface active agents from metal alkyls.

The molecules of nonionic surface active agents, in general, consist of two parts or moieties: a hydrophobic water-insoluble portion and a hydrophilic water-soluble portion. Compounds wherein the hydrophobic water-insoluble moiety of the molecule is a higher-alkyl radical and the hydrophilic or water-soluble moiety is a polyoxyalkylene radical are well known and widely used in the art as surface active agents having excellent surface-active properties for many applications. The structure of such compounds may be represented by the following formula:

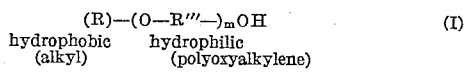

$$(\text{R})-(\text{O}-\text{R}''')_m\text{OH} \quad \text{(I)}$$
hydrophobic  hydrophilic
(alkyl)    (polyoxyalkylene)

wherein R is a higher-alkyl or aralkyl radical, R''' is a lower-alkylene radical, and m is an integer.

In the past, such surface active agents have been prepared by various processes involving less than optimum economic considerations, as by the preparation and isolation of a higher alcohol and subsequent reaction of the alcohol with an alkylene oxide. Such processes are quite involved and require expensive starting reactants. It is therefore apparent that it would be highly desirable to have available a readily reproducible and economical process for the production of such compounds.

It is an object of the present invention to provide a novel method for the production of nonionic surface active agents. Another object is to provide a novel method for the production of surface active agents comprising an alkyl group and a polyoxyalkylene chain. An additional object is to provide a method of producing such surface active agents without the employment of expensive intermediates. A still further object is to provide a method of preparing such surface active agents from organometallic compounds.

Additional objects will be apparent to one skilled in the art and still other objects will become apparent hereinafter.

The foregoing and additional objects are accomplished by (1) oxidizing an aluminum alkyl to reduce its ability to cause polymerization of lower-alkylene oxides, (2) treating the product of step (1) with a basic alkali metal hydroxide to inactivate any residual aluminum alkyl compounds, (3) condensing a lower-alkylene oxide with the product of step (2), and (4) hydrolyzing the product of step (3).

United States Patent 2,870,100 teaches that the alkyls of metals of Groups II and III of the Periodic Table are useful catalysts for the homopolymerization of alkylene oxides. It would therefore be expected that, when such metal alkyls are treated with a lower-alkylene oxide, the products would be high molecular weight polyoxyalkylene polymers.

It has now been found that when aluminum alkyls are treated by the process of the present invention, their catalytic activity directed at promoting homopolymerization of alkylene oxides is eliminated and, instead, when the aluminum alkyls which have been so treated are reacted with alkylene oxides, an organometallic compound is formed which may be readily hydrolyzed to produce the desired surface active agent.

The surface active agents which are the products of the present invention are low molecular weight polymers wherein from 2 to 20 and preferably from 3 to 10 alkylene oxide units, e.g., ethylene oxide units, form the longest chain. These products are obtained by reacting the desired molar ratios of alkylene oxide and aluminum alkyl of reduced catalytic activity. In contrast, when the catalytic activity of the aluminum alkyls is not reduced, even though the same ratios of reactants are employed, the products are high molecular weight polymers wherein about 500 or more alkylene oxide units have combined to form a single chain. Such products are not suitable as surface active agents, even after hydrolysis to remove the metal.

The aluminum alkyl compounds utilized in the process of the present invention have the formula:

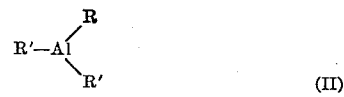

$$R'-Al\begin{matrix}R\\ \diagdown\\ R'\end{matrix} \quad \text{(II)}$$

wherein R is an alkyl or aralkyl radical having at least 4 carbon atoms, and wherein each R' is a member of the group consisting of a halogen atom, a hydrocarbon radical, and an alkoxy radical. The alkyl radicals of these aluminum alkyl compounds have been found to have an important function in the production of the desired surface active agents, as well as a decided influence on the properties thereof. The preferred aluminum alkyl compounds are those in which each R and R' is an alkyl group having at least 6 carbon atoms.

The alkyl radicals of the starting organoaluminum compounds may be straight, branched, or cyclic alkyl or aralkyl, and have at least 4 carbon atoms, such as butyl, isobutyl, n-pentyl, 1-methylbutyl, 1-ethylpropyl, 1,2-dimethylpropyl, hexyl, heptyl, octyl, decyl, dodecyl, hexadecyl, 1-decyldodecyl, cyclohexyl, cyclopentyl, methylcyclohexyl, 1-decyl-9-methyldodecyl, benzyl, phenethyl, phenpropyl, 4-phenylnonyl, 10-phenylundecyl, and the like.

The halogen atoms may be chlorine or bromine. Representative alkoxide radicals which may be used are methoxy, ethoxy, isopropoxy, butoxy, octyloxy, and the like, and preferably contain up to and including twelve carbon atoms. The groups other than alkyl groups which may be attached to the metal are those which will not cause undesired side effects when the metal alkyls are processed to produce the surface active agents. These compounds and others are shown in the aforementioned U.S. Patent 2,870,100. The best results have been obtained employing aluminum trialkyls wherein the alkyl radicals have from eight to thirty carbon atoms.

The lower-alkylene oxides which may be employed in the present invention are those which have from two to four carbon atoms, and are capable of condensing with alkyl groups and further polymerizing to form water solubilizing moieties. Preferred compounds are those which have from two to three carbon atoms, such as ethylene oxide and propylene oxide.

According to the invention, the aluminum alkyl is treated with oxygen or an oxygen-containing gas wherein the other components are inert to the reaction, such as dry air. The process may be carried out as shown in U.S. Patent 3,042,696. The resulting product is an aluminum alcoholate. The lower-alkylene oxide may in theory be added directly to the aluminum alcoholate. Such direct addition, however, is undesirable, since sufficient amounts of the catalytically active aluminum alkyls always remain even after the oxidation process, which cause homopolymerization of the alkylene oxide. Consequently, after the oxidation step, the residual catalytic activity is reduced to a satisfactory level by the addition of a small amount of a basic hydroxide. Subsequently, a lower-alkylene oxide is reacted with the treated reaction product of diminished activity to form metal alkylpolyoxyalkylene compounds of the formula:

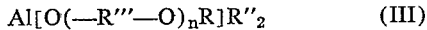
$$Al[O(-R'''-O)_nR]R''_2 \qquad (III)$$

wherein R has the value previously assigned, R''' is a lower-alkylene radical, i.e., a divalent hydrocarbon radical having two through four carbon atoms, $n$ is an integer greater that one, and R'' is selected from the group consisting of a halogen atom and an $-O(-R'''-O)_nR$ group. The compounds thus formed are subsequently hydrolyzed to yield the desired surface active agents represented by the foregoing Formula I.

Higher aluminum alkyls may be advantageously employed according to the process of the invention to produce certain desired nonionic surface-active agents. Such higher aluminum alkyls may be readily prepared by heating an aluminum alkyl, e.g., aluminum triisobutyl, with a high molecular weight alphaolefin or aralkylene hydrocarbon having a terminal double bond in the presence of a nickel catalyst. This reaction liberates isobutylene which may then be reconverted to aluminum triisobutyl by treatment with aluminum and hydrogen. Alternatively, higher aluminum alkyl may be prepared by the reaction of hydrogen, aluminum, and a lower-aliphatic olefin, e.g., to produce an aluminum trialkyl such as aluminum triethly, and by the subsequent addition of greater quantities of a lower-alphatic olefin such as ethylene, propylene, or the like.

Other representative olefins which may be used are styrene, 3 - phenylpropene-1, 4 - phenylnonene - 1, 10-phenylundecene-1, cyclohexene, et cetera. Several references describe the processes discussed above in detail, as well as the preparation of alkyl aluminum from aluminum, hydrogen and olefin. They are Ziegler, Angewandte Chemie 67, 424–426 (1955); Ziegler, Brenstoffe Chemie 35 (21/22), 321–325 (1954); British Patents 770,707 and 801,604.

The aluminum alkyl oxidation process may be conveniently carried out by passing air through a solution of the aluminum alkyl in any inert solvent therefor, such as benzene, decalin, n-hexane, or cyclohexane. The reaction conditions for this first step may be varied widely. For example, the reaction may be carried out by passing dry air at atmospheric pressure through the reaction mixture at a temperature of about 50 to about 200° C. The product of this step is a higher aluminum alcoholate. Complete oxidation of the alkyl is difficult to obtain, and the remaining traces of unoxidized alkyl aluminum may cause homopolymerization of lower-alkylene oxide. In order to obtain more complete reduction in catalytic activity for the remaining aluminum alkyl, about 0.1 to 10% of a basic inorganic hydroxide based on the weight of the starting aluminum alkyl is added to the oxidized metal alkyl product in a second step. The useful basic inorganic hydroxides are the alkali metal hydroxides, e.g., sodium, potassium, lithium, rubidium and cesium hydroxides.

The lower-alkylene oxide may then be reacted with the reaction product of the second step either with or without prior isolation of the aluminum alkyl. Sufficient ethylene or other lower-alkylene oxide is introduced into the reaction to produce a water-soluble addition product. It is preferred that an amount be added sufficient to form a polyoxyethylene or other polyoxyalkylene chain having a molecular weight about equal to that of the higher-alkyl group. The lower-alkylene oxide addition step may be carried out according to the conventional procedure, e.g., at a temperature of about 0° to about 200° C., and preferably about 80° to about 150° C.

The products of the addition of ethylene oxide or other alkylene oxide to the higher aluminum alkyls are metal alcoholates having polyoxyalkylene, e.g., polyoxyethylene, chains which terminate in alkyl groups. These products are readily hydrolyzed to produce the desired surface active agents. The hydrolysis step may be carried out by treating the aluminum alcoholate with water in the presence of an acid, e.g., phosphoric, sulfuric, hydrochloric, or the like. Mineral acids are preferred, although numerous organic acids may also be employed, as well as compounds which form acids in situ under the conditions of reaction, e.g., acetyl chloride, thionyl bromide, or the like. Preferably, the acid is so selected as to be capable of precipitating the metal from solution in the form of a salt, for example, as aluminum phosphate.

In its preferred aspect, the present invention may be employed by using basic starting materials such as aluminum, hydrogen, ethylene oxide and ethylene or a higher olefin to produce inexpensive nonionic surface active agents.

Many methods of purification of nonionic surface-active agents are known and may be employed to purify the products. Filtration and stripping of volatile impurities under reduced pressure are exemplary of purification procedures which may be employed.

It is well known in the field of alkylene oxide chemistry that when a reactive hydrogen compound is subjected to oxyalkylation, a compound is produced which is in fact a polymer of the alkylene oxide having the reactive hydrogen compound as a terminal group. Further, when a large proportion of alkylene oxide to reactive hydrogen compound is used, the reaction product is not a single molecular compound having a defined number of oxyalkylene radicals but, rather, a mixture of closely related or touching or adjacent homologs wherein the statistical average number of oxyalkylene groups equals the relative number of moles of the alkylene oxide employed, and the individual members present in the mixture contain varying numbers of polyoxyethylene groups. Thus, the compositions of this invention are mixtures of compounds which may be defined in terms of molecular weight and weight percent. For convenience in referring to such products as are produced by the process of the present invention, the term "cogeneric mixture" is employed. This term has been coined to designate the mixture of a series of closely related homologs that are obtained by condensing a plurality of alkylene oxide units with a reactive hydrogen compound. The term is defined in greater detail in U.S. Patent 2,549,438.

Various types of products may be obtained in utilizing the process of the present invention by appropriately choosing the reactants and reaction conditions. For example, when a single alkylene oxide, such as ethylene oxide, is reacted with an aluminum alcoholate, the resulting molecules have a structure in the form of a chain comprised of oxyethylene segments terminated by the aluminum alcoholate.

When two or more different alkylene oxides are utilized, such as ethylene oxide and propylene oxide, the structure of the molecules formed may be one of several different types depending upon the nature of the process used. Where both alkylene oxides are mixed together and simultaneously reacted with the aluminum alcoholate, the resulting product has a structure that is commonly termed a "heteric" structure, that is, a structure in which the different individual alkylene oxide radicals are randomly distributed throughout the polyoxyalkylene portion of the molecular chain. Alternatively, when a sequential procedure is employed and one of the alkylene oxides is first reacted with the aluminum alcoholate, and the other subsequently added and reacted, a molecular structure is formed which is commonly known as of the "block" or "conjugated" type. In this structure the molecular chain is comprised of a polymerized segment of one alkylene oxide connected to a polymerized segment of the other alkylene oxide, thus providing a conjugated or repeated unit structure. Whether the chain comprises ethylene oxide alone or a mixture of ethylene oxide and other oxides, the oxygen/carbon atom ratio of the chain must be at least 0.40. The hydrophilic polyoxyalkylene chain should constitute 5% to 90% by weight of the product for a surface active agent, and at least 40% by weight for a detergent.

The following examples are given by way of illustration only and are not to be construed as limiting.

In the following examples the carbon soil test is carried out as described in U.S. Patent 2,674,619, column 6, lines 18–75, and column 7, lines 1–49, and surface tension reduction is determined by the standard Du Nöuy test.

*Example 1A.—Preparation of higher aluminum alkyl*

A mixture of 16.5 grams (.083 mole) of triisobutyl aluminum, 50 grams (approximately .25 mole) of alpha-olefins of about 200 average molecular weight, e.g., Distilled Blend No. 4A, and a catalytic amount of nickel catalyst is heated to a temperature of 125° to 130° C. with stirring. The heating is continued for 90 minutes after which no more isobutylene is evolved.

Distilled Blend No. 4A is prepared and marketed by Atlantic Refining Co., and is stated by the manufacturer to have the following compositions:

BLEND NO. 4A COMPOSITION

| | Percent |
|---|---|
| $C_{13}$ | 16.3 |
| $C_{14}$ | 32.2 |
| $C_{15}$ | 29.4 |
| $C_{16}$ | 18.9 |
| $C_{17}$ | 1.4 |
| Aromatics | 1.8 |
| $RCH=CH_2$ | 99 |

1%R'
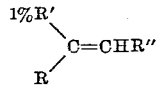

Boiling Range—455–580° F.
Sp. Gr. 60/60—0.787.

*Example 1B.—Oxidation of higher aluminum alkyl*

The product of Example 1A is placed in a reaction flask and heated to a temperature of 54° to 90° C. Dry air is passed through the reaction mixture with vigorous stirring for a period of 4 hours.

*Example 1C.—Oxyalkylation*

The product of Example 1B together with 1 gram of sodium hydroxide is introduced into a reaction flask fitted with a Dry Ice-acetone condenser (to maintain a reflux of the ethylene oxide). To this mixture, 67 grams (1.5 moles) of ethylene oxide is added at a reaction temperature of 120° to 150° C.

*Example 1D.—Hydrolysis*

The product of Example 1C is dissolved in methanol and the resulting solution treated with 95% phosphoric acid in order to precipitate the aluminum as aluminum phosphate, which is immediately filtered off. The solution is then placed in a rotating evaporator where volatile impurities are stripped off.

The product is a slightly yellow paste which dissolves in water to give a solution of good foaming power. A 0.1% solution is found to lower the surface tension of water to 32.1 dynes per centimeter at 25° C. The hydroxyl number shows the product to have an average molecular weight of about 965.

*Example 2A.—Preparation of higher aluminum alkyl*

A mixture of 5.7 grams (0.05 mole) of triethyl aluminum and 57 grams of benzene is introduced into a rocking bomb autoclave. The temperature of the reaction mixture is adjusted to 140° to 155° C. and a pressure of 250 to 480 pounds per square inch (gauge). One mole (26 grams) of ethylene, enough to bring the average molecular weight of each alkyl group up to 200, is then added and the reaction allowed to proceed for 12 hours.

*Example 2B.—Oxidation*

The product of Example 2A is oxidized according to the procedure of Example 1B employing a period of 5 hours and a temperature of 57° to 96° C.

*Example 2C.—Oxyalkylation*

A sufficient amount of ethylene oxide (26 grams) is added to the product of Example 2B, utilizing the procedure described in Example 1C, to bring the average molecular weight of the product to a value of 400.

*Example 2D.—Hydrolysis*

The product of Example 2C is treated according to the procedure of Example 1D to yield a product having good detergent properties. A 0.1% solution of the product lowers the surface tension of water to 33.6 dynes per centimeter at 25° C.

*Example 3*

In the same manner as given in Example 1, a surface active agent is prepared from triisobutyl aluminum styrene, and ethylene oxide.

*Example 4*

In the same manner as given in Example 1, a surface active agent is prepared from triisobutyl aluminum, alpha-olefins having an average molecular weight of 200, e.g., Distilled Blend No. 4A, and a mixture of propylene oxide and ethylene oxide.

*Example 5*

The product of Example 1B is introduced together with 1 gram of sodium hydroxide into a reaction flask fitted with a Dry Ice-acetone condenser. One and one-half moles of propylene oxide are added at a reaction temperature of 120°–150° C. The resultant product is dissolved in methanol and the solution treated with 95% phosphoric acid to precipitate the aluminum. The product is purified by stripping. The purified product exhibits excellent detergent properties.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the production of a cogeneric mixture of nonionic surface active agents comprising the steps of (1) oxidizing at a temperature of about 50° to about 200° C. a compound selected from those having the formula:

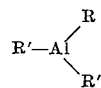

wherein R is an alkyl group having 4–30 carbon atoms inclusive and each R' is a member of the group consisting of chlorine, bromine, a hydrocarbon radical having 4–30 carbon atoms inclusive and an alkoxy radical having 4–30 carbon atoms inclusive, (2) adding an alkali metal hydroxide in an amount of about 0.1 to 10% by weight, with respect to said aluminum alkyl or aralkyl, to the product of step (1), (3) condensing a lower-alkylene oxide having 2 to 4 carbon atoms, inclusive with the product of step (2) at a temperature of about 0° to about 200° C., and (4) hydrolyzing the product of step (3) by mixing and reacting an acid therewith wherein the amount of the compound added in step (1) is sufficient so that the hydrophobic hydrocarbon portion of the compound obtained in step (4) constitutes at least about 10% by weight of the product obtained in step (4).

2. A process according to claim 1, wherein said alkali metal hydroxide of step (2) is sodium hydroxide.

3. A process according to claim 1, wherein said alkali metal hydroxide of step (2) is potassium hydroxide.

4. A process according to claim 1, wherein said aluminum alkyl of step (1) is a higher aluminum alkyl having 5–30 carbon atoms inclusive in each R and R' group.

5. A process according to claim 1, wherein the amount of lower-alkylene oxide added in step (3) is such that the resulting hydrophilic polyoxyalkylene chain constitutes from about 5% to about 90% by weight of the product obtained in step (4).

6. A process according to claim 1, wherein the amount of lower-alkylene oxide added in step (3) is such that the resulting hydrophilic polyoxyalkylene chain constitutes at least 40% by weight of the product obtained in step (4).

7. A process according to claim 1, wherein said aluminum alkyl is oxidized by passing air through a solution of said aluminum alkyl in an inert solvent.

8. A process according to claim 1, wherein said lower-alkylene oxide of step (3) is ethylene oxide.

9. A process according to claim 1, wherein said lower-alkylene oxide of step (3) is propylene oxide.

10. A process according to claim 1, wherein said lower-alkylene oxide of step (3) is butylene oxide.

11. A process for the production of a cogeneric mixture of nonionic surface active agents comprising the steps of (1) oxidizing at a temperature of about 50° to about 200° C., a compound selected from the group consisting of aluminum alkyls and aluminum aralkyls wherein each alkyl and aralkyl group has 4 to 30 carbon atoms, inclusive, (2) adding an alkali metal hydroxide in an amount of about 0.1 to 10% by weight, with respect to said aluminum compound, to the product of step (1), (3) condensing ethylene oxide and another lower-alkylene oxide having 3 to 4 carbon atoms, inclusive with the product of step (2) at a temperature of about 0° to about 200° C., and (4) hydrolyzing the product of step (3) by mixing and reacting an acid therewith, wherein a sufficient amount of ethylene oxide is utilized in step (3) so that the oxygen/carbon atom ratio of the hydrophilic polyoxyalkylene chain formed is at least 0.40.

12. A process according to claim 11, wherein said other lower-alkylene oxide of step (3) is propylene oxide.

13. A process according to claim 11, wherein said ethylene oxide and said other lower-alkylene oxide are simultaneously condensed with the product of step (2).

14. The process according to claim 11, wherein said ethylene oxide and said other lower-alkylene oxide are sequentially condensed with the product of step (2).

15. A process for the production of a cogeneric mixture of nonionic surface active agents comprising the steps of (1) reacting a lower aluminum alkyl having up to and including four carbon atoms per alkyl group with an alpha-olefin having 4 to 30 carbon atoms, inclusive, to produce an aluminum alkyl wherein said alkyl groups each have 4 to 30 carbon atoms inclusive, (2) oxidizing at a temperature of about 50° to about 200° C. the product of step (1) by passing an oxygen-containing gas therethrough, (3) adding an alkali metal hydroxide in an amount of about 0.1 to 10% by weight, with respect to said aluminum compound, to the product of step (2), (4) condensing a lower-alkylene oxide having 2 to 4 carbon atoms, inclusive with the product of step (3) at a temperature of about 0° to about 200° C., and (5) hydrolyzing the product of step (4) by mixing and reacting an acid therewith.

16. A process according to claim 15, wherein a sufficient amount of said lower-alkylene oxide is utilized in step (4) so that the resulting hydrophilic polyoxyalkylene chain constitutes from about 5% to about 90% by weight of the product obtained in step (5).

17. A process according to claim 15, wherein a sufficient amount of said lower-alkylene oxide is utilized in step (4) so that the resulting hydrophilic polyoxyalkylene chain constitutes at least 40% by weight of the product obtained in step (5).

18. A process according to claim 15, wherein said lower-aliphatic olefin of step (1) is ethylene.

References Cited by the Examiner

UNITED STATES PATENTS

| | | | |
|---|---|---|---|
| 2,870,100 | 1/1959 | Stewart et al. | 260—615 |
| 2,921,949 | 1/1960 | Kirshenbaum et al. | 260—632 |
| 3,042,696 | 7/1962 | Aldridge | 260—632 |

FOREIGN PATENTS

| | | |
|---|---|---|
| 785,053 | 10/1957 | Great Britain. |
| 785,229 | 10/1957 | Great Britain. |
| 799,955 | 8/1958 | Great Britain. |

LEON ZITVER, *Primary Examiner.*

H. T. MARS, *Assistant Examiner.*